(12) United States Patent
Omer et al.

(10) Patent No.: US 9,110,921 B2
(45) Date of Patent: Aug. 18, 2015

(54) MAP EDITING WITH LITTLE USER INPUT

(75) Inventors: Ido Omer, Seattle, WA (US); Eyal Ofek, Redmond, WA (US); John-Michael Wiley, Redmond, WA (US); Gonzalo Ramos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 735 days.

(21) Appl. No.: 13/165,588

(22) Filed: Jun. 21, 2011

(65) Prior Publication Data

US 2012/0331009 A1 Dec. 27, 2012

(51) Int. Cl.
*G06F 17/30* (2006.01)

(52) U.S. Cl.
CPC ................ *G06F 17/30241* (2013.01)

(58) Field of Classification Search
CPC ............... G06F 17/30241; G06F 17/30345
USPC .......... 707/802, 999.1, 999.101; 701/532, 533
See application file for complete search history.

(56) References Cited

U.S. PATENT DOCUMENTS

| | | | |
|---|---|---|---|
| 7,216,034 B2 * | 5/2007 | Vitikainen et al. ............ 701/533 |
| 7,647,341 B2 | 1/2010 | Ojima |
| 2008/0109158 A1 * | 5/2008 | Huhtala et al. ................ 701/208 |
| 2008/0120026 A1 | 5/2008 | Cummings |
| 2010/0179755 A1 * | 7/2010 | Kohno et al. .................. 701/208 |
| 2011/0276263 A1 * | 11/2011 | Shimotani et al. ............ 701/200 |
| 2012/0271864 A1 * | 10/2012 | Morlock ......................... 707/803 |

OTHER PUBLICATIONS

Fathi, et al., "Detecting Road Intersections from GPS Traces", Retrieved at <<http://research.microsoft.com/en-us/um/people/jckrumm/publications%202010/intersection_detector_giscience%20web.pdf>>, Proceedings of the 6th international conference on Geographic information science, Sep. 14-17, 2010, 14 pages.

Kalkusch, et al., "Structured Visual Markers for Indoor Pathfinding", Retrieved at <<http://ieeexplore.ieee.org/xpl/freeabs_all.jsp?arnumber=1107018>>, Proceedings of the First IEEE International Workshop on ARToolKit, date: 2002, pp. 1-8.

Yun, Seokchan (Channy) "The User-participated Geospatial Web as Open Platform", Retrieved at <<http://citeseerx.ist.psu.edu/viewdoc/download?doi=10.1.1.130.3976&rep=rep1&type=pdf>>, Proceedings of the 11th International Seminar on GIS, Oct. 24, 2007, 12 pages.

(Continued)

*Primary Examiner* — Hares Jami
(74) *Attorney, Agent, or Firm* — Steven Spellman; Danielle Johnston-Holmes; Micky Minhas

(57) ABSTRACT

A semi-automatic map editor may allow a user to add features to a map with a minimum of effort. In one example, a user may add a road to a map by indicating where the endpoints of the road are. A system may then attempt to fill in the path of the road using the user-provided endpoints, an analysis of an aerial or satellite photograph, existing maps that show the road, or any other appropriate information. Using this information, the system may display a proposed path for the road between the endpoints that the user has indicated. The user may then fine tune and/or confirm the proposed path, thereby adding the road to the map. In addition to roads, other feature such as bodies of water, ski trails, etc., may be added in this manner.

20 Claims, 5 Drawing Sheets

(56) References Cited

OTHER PUBLICATIONS

Grape, Mattias, "OpenStreetMap", Retrieved at <<http://epubl.ltu.se/1402-1617/2009/180/LTU-EX-09180-SE.pdf>>, date: 2009, 64 pages (pp. 1-57, and the 7 unnumbered pages that precede p. 1).

"Archive for the 'Map Editing' Category", Retrieved at <<http://www.waze.com/user_blog/?cat=6>>, Retrieved Date: Mar. 24, 2011, document dated: 2009, 5 pages.

"Google Maps", Retrieved at <<http://maps.google.com/support/bin/static.py?hl=en&page=guide.cs&guide=21670&topic=21676&from=21676&rd=2>>, Retrieved Date: Mar. 24, 2011, 3 pages.

Ofek, Eyal, "Magic Shop", screen shots captured at << http://www.youtube.com/watch?v=LR0WV2dGIRc >>, video upload date: Jan. 29, 2011, 4 pages.

\* cited by examiner

MAP EDITING WITH LITTLE USER INPUT

BACKGROUND

Many online and standalone applications provide maps to users. For example, some web sites (such Google, MapQuest, and the BING service) allow users to request maps, and also use maps to provide directions. An automobile navigation box or dashboard navigation console uses maps to provide real-time interactive directions. The geographic information that is used to display maps is generally built from a visual analysis of geographic features of the land. For example, a map provider such as Navteq or Tele Atlas may perform computer-assisted analysis of aerial or satellite photographs to identify the true locations of roads. However, such maps may omit certain roads, or other topographic features (e.g., trails, bodies of water, etc.). In some cases, a road or other feature is omitted from a map because it was not discernible from the photographs that were used to generate the map. In other cases, a road or feature is omitted because it is new—e.g., a new neighborhood or a new ski trail might be built after the map is created. In this case, it may be possible for a person to add the feature to the map by hand.

Editing a map by hand, however, can be tedious. For example, in order to add a road to a map, a user would have to trace the location of the road by hand over an existing map or over an existing aerial or satellite photograph. Similarly, to add a body of water such as a lake, a user would have to trace the outline of the body of water by hand.

SUMMARY

The process of adding a feature to a map may be simplified, and semi-automated, by collecting a small amount of data from a person and using that data to estimate the location of the feature that the user wants to add to a map. The user can then confirm the estimated location, or make minor adjustments to the estimated location, thereby adding new data to the map with relatively little human effort.

For example, if a user wants to add a road, the user may enter the endpoints of the road on a map or photograph of the area in which the road is located. Or, if the user wants to add a lake, the user might enter a point near the middle of the lake. Even if the outline of the road or lake was not easily discernible from a photograph of the area, having a human provide a small amount of information such as a road's endpoints may be sufficient to allow a photograph analyzer to detect the road. When the location of the road is detected in the photograph, the proposed location may be shown, and a user may be able to fine tune the location. For example, after the user enters the endpoints of a road, a system could show the user what the system believes to be the correct path of the road (as determined, for example, from an analysis of an aerial or satellite photograph), and the user might be able to change the path (if the user thinks the path shown by the system is wrong), or could confirm the proposed path of the road. In this way, a system that provides maps can leverage the efforts of its users to add new features to the map, or to refine existing features.

When the user adds a road to the map, the system may propose additional roads to be added. For example, once a user has made the path of a new road known to the system, the system could use this path to identify cross streets that intersect the new road. The user could then enter additional endpoints, showing the locations of the cross streets.

In addition to using data entered by a user to identify the location of a road, a system may also identify that location using existing data about the road. For example, an existing municipal map may show the location of a road, even though the location has not been verified by a real person. If the user provides the endpoints of the road and those endpoints match what the municipal map shows, then the user is effectively corroborating what the map says. This corroboration tends to increase the veracity of what the municipal map says about where the road is located. Thus, when showing the user a proposed path for the road, the system may use both an existing map and whatever information can be inferred from a photograph of the topography.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
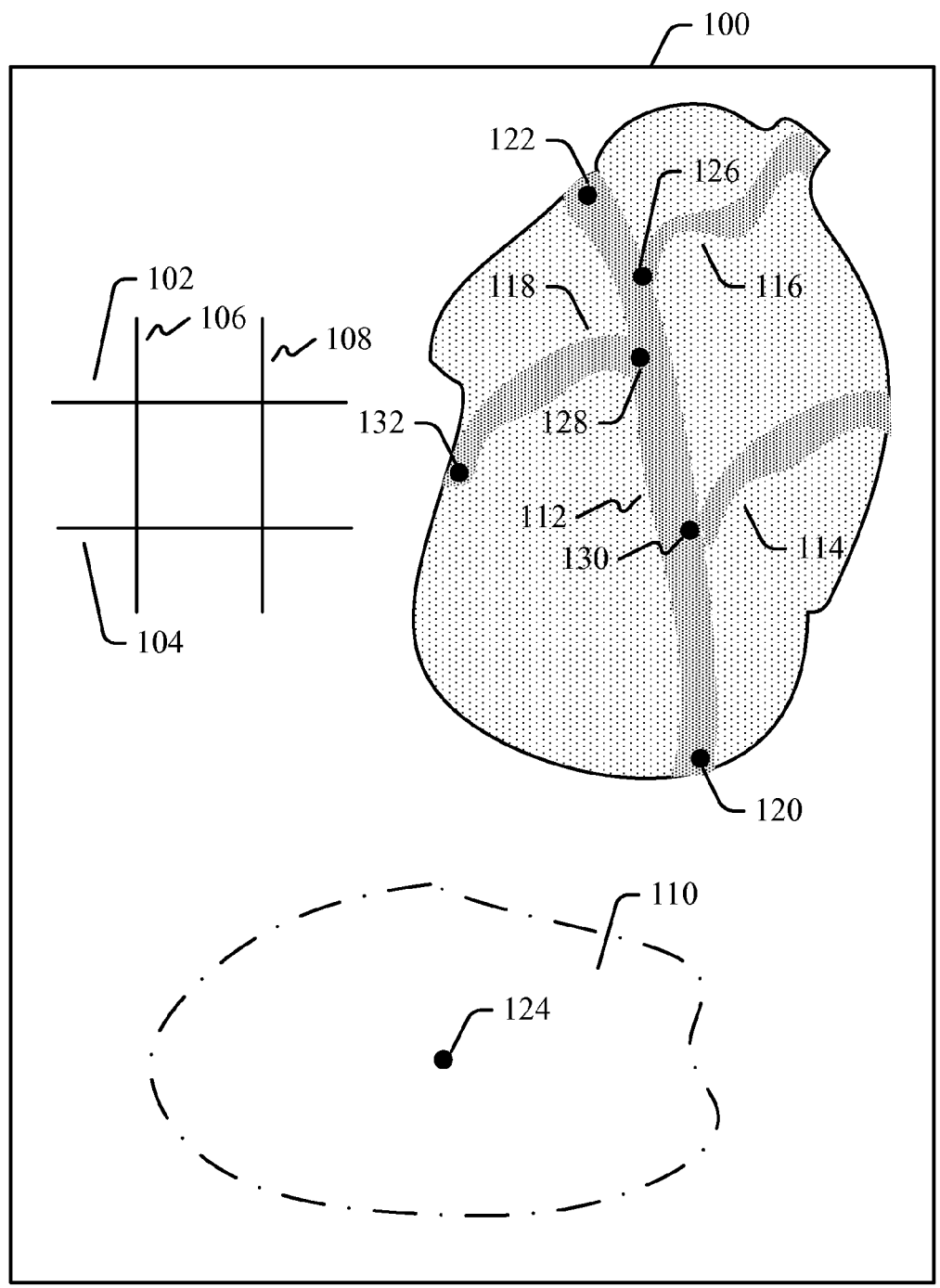
FIG. 1 is a block diagram of an example geographic region with both marked and unmarked features.

There are many types of online and standalone systems that provide maps. Map data is generally created from satellite or aerial photographs of an area. The map is created both by automated analysis of the photographs (e.g., a road has a signature appearance in an aerial photograph, which can be detected automatically), and also by human verification of the analysis. Thus, in order to create an electronic map of an area, a photograph is analyzed by machine to determine where the roads appear to be, and a human typically evaluates the machine analysis for correctness—either by examination of the photograph, or by an "on-the-ground" visit to the area that is shown in the map. Navteq and Tele Atlas are commercial map providers that create maps using roughly the foregoing process.

In many cases, roads or other topographic features exist that do not appear on a map. There are various reasons why a road or other topographic feature might not appear on a map. For example, a new neighborhood may have been built after a map was created. Or, a particular road or topographic feature may be difficult to discern from an aerial or satellite photograph (e.g., given the angle of a photograph and the time of year at which the photograph was taken, a road might be completely obscured by trees). One way to remedy the absence of a road or other feature is for a person to enter the information manually. There are map editors that allow people to add new features to a map. However, these features are often tedious to use. For example, in order to add a new road, a person may have to trace the path of the road, freehand, on the map (which may involve tracing the path of a road over an aerial or satellite photograph). Similarly, in order to add a topographic feature such as a lake (or other body of water), a person would have to trace the outline of the lake.

The subject matter described herein simplifies the process of editing a map, by allowing the editing to happen semi-automatically. When a road or other feature is to be added to a map, a user may identify a small number of points that are relevant to the feature. For example, if the feature to be added is a road, the user might provide the endpoints of the road. Using these endpoints, an automatic evaluator may be able to estimate, with a high level of probability, the correct path for the road for which the user has marked the endpoints. This estimate might come from various sources. For example, there might be an aerial or satellite photograph of the area. The detail in such photographs might ambiguously suggest the presence of a road, and the road's path. (E.g., the details in the topography suggesting a road might be visible but faint; thus, such details might be considered non-conclusive evidence of a road.) Or, in another example, there might be a municipal map showing the road, but the veracity of the municipal map might be in question. Or, in yet another example, there could be user-supplied photos, such as photos of a region taken from the top of a hill or building (with sufficient user input regarding where the roads on these photos are, a system could be trained to recognize the paths of roads or outlines of features on these maps, and/or could establish a correspondence between these photos and existing maps.) However, once the user has indicated the endpoints of the road, it can be determined whether these details corroborate the faint details on a photograph, or the details that are shown on a municipal map of unknown veracity. If the user's input corroborates the details, then it becomes considerably more likely that the correct path of the road is what faintly appears on the photograph, or what is shown on the municipal map. This path may then be proposed to the user. The user may fine tune the path that is shown to him or her by making minor adjustments. In this way, the user can confirm or tune a likely path for the road, rather than having to draw the path of the road from scratch.

In addition to using existing photographs or maps to infer the path of a road, a system might infer the path using various heuristics. For example, it might be assumed that roads make gentle turns rather than tight turns, so if a photograph appears to show two possible paths of a road, the one with gentler turns might be favored as the likely path of the road.

Allowing users to identify the location of a road by entering a small amount of information and then confirming an estimate makes it easy for users to identify new roads with little work. In this way, labor is efficiently divided between human and machine: humans provide disambiguating details based on the kind of first-hand knowledge that humans can easily gather (e.g., the endpoints of a road), and machines leverage this small amount of detail to fill in the missing information (e.g., the complete path of a road). In this way, people can increase the body of geographic information considerably by putting in very little effort, which encourages people to contribute this type of information. In some cases, after a user confirms the path of a new road, the system might use that information to discern possible cross streets that intersect the road. Since the user has already been willing to assist in the creation of a map by providing endpoints of a street, the system might try to leverage the user's interest in adding to the map by showing possible intersections with the new road whose location the user has confirmed, and asking the user to provide endpoints for those cross-streets. (As an alternative to providing endpoints of a road, one or more of the points might be waypoints—i.e., points that are in the middle of a road's path, rather than on the ends. It will be understood that any description herein of a user's providing endpoints can be applied equally in the situation where one or more of the points that the user provides are waypoints.)

While the foregoing discussion uses a road as an example feature that a user could add to a map, there are other types of features that a user could add, such as lakes (or other bodies of water), ski trails, biking or walking trails, railroads, fences, etc. For example, a user could indicate the presence of a lake on an aerial photograph by marking the center of the lake, thereby prompting the system to determine the outline of the lake. (Or, more generally, the user could mark some central point in a geographic aspect of the land, where a lake is an example of a geographic aspect, and where a point near the center of the lake is an example of such a central point.) In general, any linear feature (e.g., road, railroad, stream, trail, etc.), any feature that has a boundary (e.g., lake, field, house, yard, building, parking lot, etc.), or any other type of feature (e.g., a crosswalk, road markings, etc.) could be added to a map using the techniques described herein.

Turning now to the drawings, FIG. 1 shows an example map 100 of a geographic region, having both marked and unmarked features. In particular, the region has streets 102, 104, 106, and 108, which are "marked" in the sense that their locations are known to the system that maintains map 100. Thus, when map 100 is displayed, streets 102-108 are shown on map 100.

Within the geographic region covered by map 100, there may be unmarked features. For example, map 100 may be superimposed over an aerial or satellite photograph of the same region, and there may be evidence in the photograph of a lake 110, as well as roads 112, 114, 116, and 118. (In FIG. 1, the evidence of roads 112-118 is represented as a differential, between the roads and the background, in the density of the dot pattern. Additionally, the evidence of lake 110 is represented as a dotted line around the lake.) However, the photographic evidence of the existence of these roads may be faint or ambiguous, so the provider of the map may have the roads and lake "unmarked" in the sense that the provider of map 100 does not show the roads and lake on map 100. Or, there may be a municipal (or other governmental map) of the region, or a commercial paper map, that shows the roads and lake as existing, but the provider of map 100 may want to obtain independent verification of the existence of the roads and lake before including them in its own map.

However, a user who has requested to see map 100 (or has obtained map 100 in response to a request for directions) may know that the roads and/or lake exist, and may want to request that some of these roads, or the lake, be added to map 100. Thus, the user may provide information that helps the system that provides is providing the map to identify the road or lake. Suppose, for example, that the user wants to add road 112 to map 100. The user may add endpoints 120 and 122. The user interface through with map 100 is being displayed to the user may be interactive, and may provide input features that allows the user to add these endpoints. Or, in another example, the user might want to add lake 110 to map 100, so the user might add a point 124 near the center of lake 110, thereby indicating that lake 110 exists.

The view of map 100 that is shown in FIG. 1 may be understood as a "photograph". (FIG. 1 is a black and white line drawing rather than an actual photograph, but it will be understood that the different densities of dot patterns shown in FIG. 1 are representative of what might be seen in a photograph.) When FIG. 1 is understood in this way, it can be seen that there is faint photographic evidence that road 112 exists. Along the path of road 112, the shades and textures are slightly different than they are in the surrounding areas. For example, if road 112 goes through a redwood grove, the trees will part slightly around the road, causing the road to appear as a disruption in an otherwise pristine grove. However, since the road is small compared with the trees, the visual photographic evidence of this disruption may be ambiguous, and the provider of map 100 may not want to mark a road as existing based on ambiguous or non-conclusive evidence. The subject matter herein is not limited to any particular way of analyzing a photograph; however, systems that analyze photographs to detect the location of roads typically operate on a statistical model. Based on the photograph, they form a hypothesis concerning the location of the road, and attempt to determine the probability (P-value) that the hypothesis is correct. Given that road 112 shows only as a faint disruption in the grove of redwood trees, it may be the case that the P-value for the hypothesis (i.e., the hypothesis that the visual disruption corresponds to an actual road) is too low for the provider of map 100 to feel comfortable marking road 112 on a map.

However, once the user has identified endpoints 120 and 122, the analysis changes. The system might have believed that there was only a 50% probability that the visual disruption in the grove of trees was a road, but—with a user having confirmed that endpoints 120 and 122 are part of a road—there is human corroboration that the visual disruption is a road. Thus, the system can show the user an estimate of where the road is located. Such an estimate is shown in FIG. 2.

Figure 2:
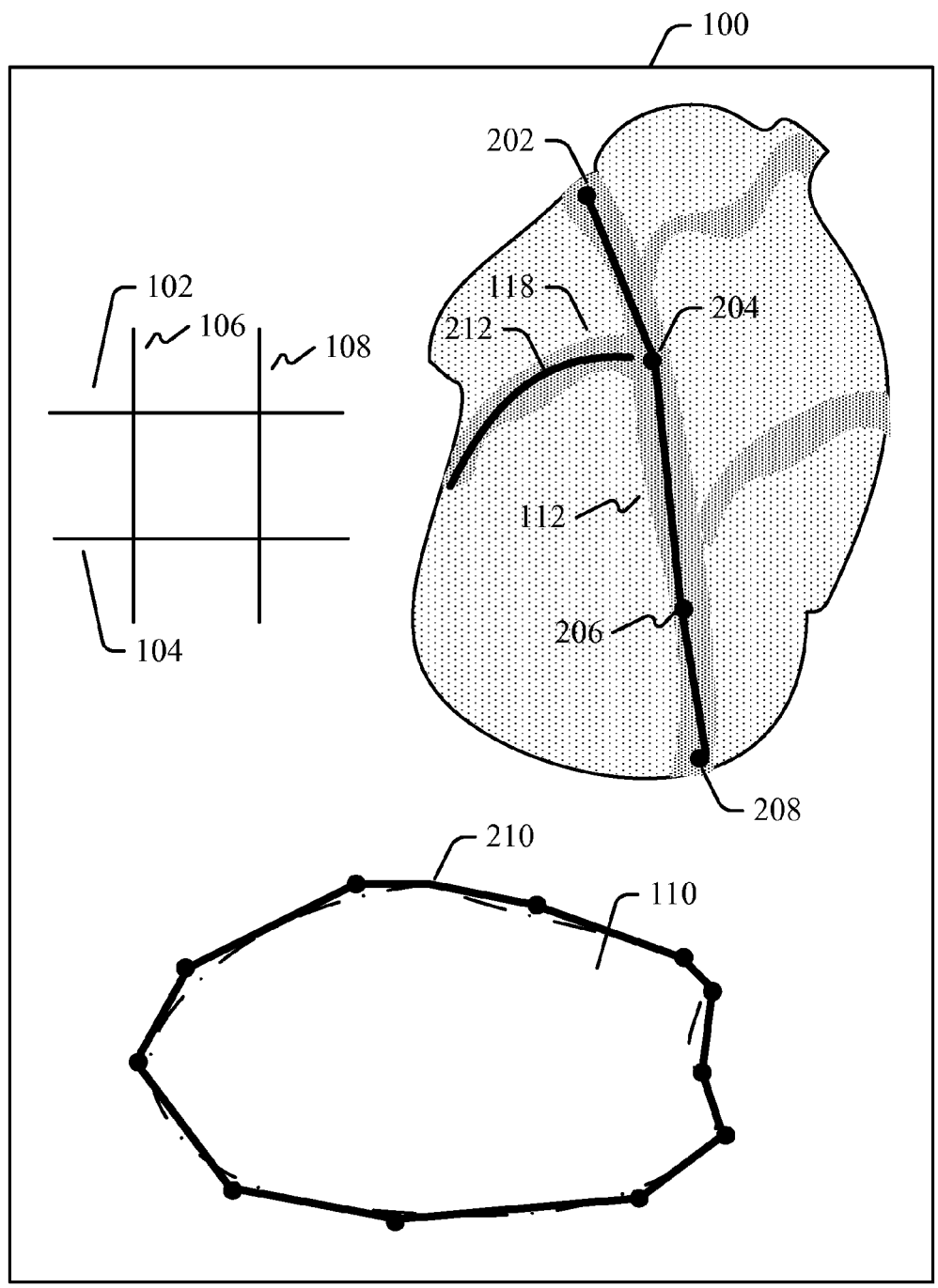
FIG. 2 is a block diagram of the geographic region of FIG. 1, with an estimate, based on human input, of where certain features in the geographic region are located.

FIG. 2 shows the same map 100 that is shown in FIG. 1, but with an estimate of the path that road 112 follows. This path is represented by the dark line passing through points 202, 204, 206, and 208 (which may be shown as a set of line segments, as depicted in FIG. 2, or as a smooth curve). The user then may be asked to confirm that road 112 follows the path shown. If the user does not agree with the proposed path, the user may fine tune the path by moving one or more of points 202, 204, 206, and 208, or by adding additional points. Once the user has confirmed the location of road 112, the system may smooth out the path represented by segments between these points, thereby producing a smooth road passing through a particular path in map 100. The road then may be added to map 100.

Returning to FIG. 1, similar actions may be performed with respect to non-road features, such as lake 110. Lake 110 may show only faintly in a photograph, but—with a user having indicated that point 124 is at the center of a lake, a system may be able to propose a boundary 210 for lake 110, as shown in FIG. 2. As with the path of road 112, the boundary may be drawn as a set of line segments between points, and the user may move or add points in order to draw the boundary more accurately. Once the user has confirmed the location of the boundary, the boundary may be smoothed out appropriately, and the system may add lake 110 to map 100. Similar actions could be performed with other types of physical features of the topography—e.g., ski runs, bike trails, etc.

Once a feature such as road 112 has been confirmed by user input, the system may build on this information in order to obtain human confirmation of other information. The subject matter herein makes it relatively easy for a user to add new features to a map, by doing for the user much of the work of drawing the path or boundary of those features. If a user has expressed interest in adding new features to a map, the system may want to leverage that interest by asking the user to add other features. For example, returning to FIG. 1, roads 114, 116, and 118 may show faintly in a photograph and thus, for reasons discussed above, a map provider might not want to assert, in its map, that those roads exist based on the photographic evidence alone. However, once the user has confirmed the existence of road 112, there is somewhat stronger evidence that roads 114, 116, and 118 exist, in the sense that the visual disruptions in the trees appear to intersect with what has now been confirmed to be road 112. The system might, therefore, show intersection points 126, 128, and 130, as a prompt to get the user to identify the locations of these roads. The user might respond, for example, by adding point 132, thereby indicating the endpoints of road 118. The system could then present the user with an estimate of the path of road 118 (shown by dark line 212 in FIG. 2), which the user could fine tune and/or confirm using the process described above. (It is noted that FIG. 2 shows roads 102, 104, 106, and 108; these roads are shown for ease of comparing the versions of map 100 that are shown in FIGS. 1 and 2.)

Figure 3:
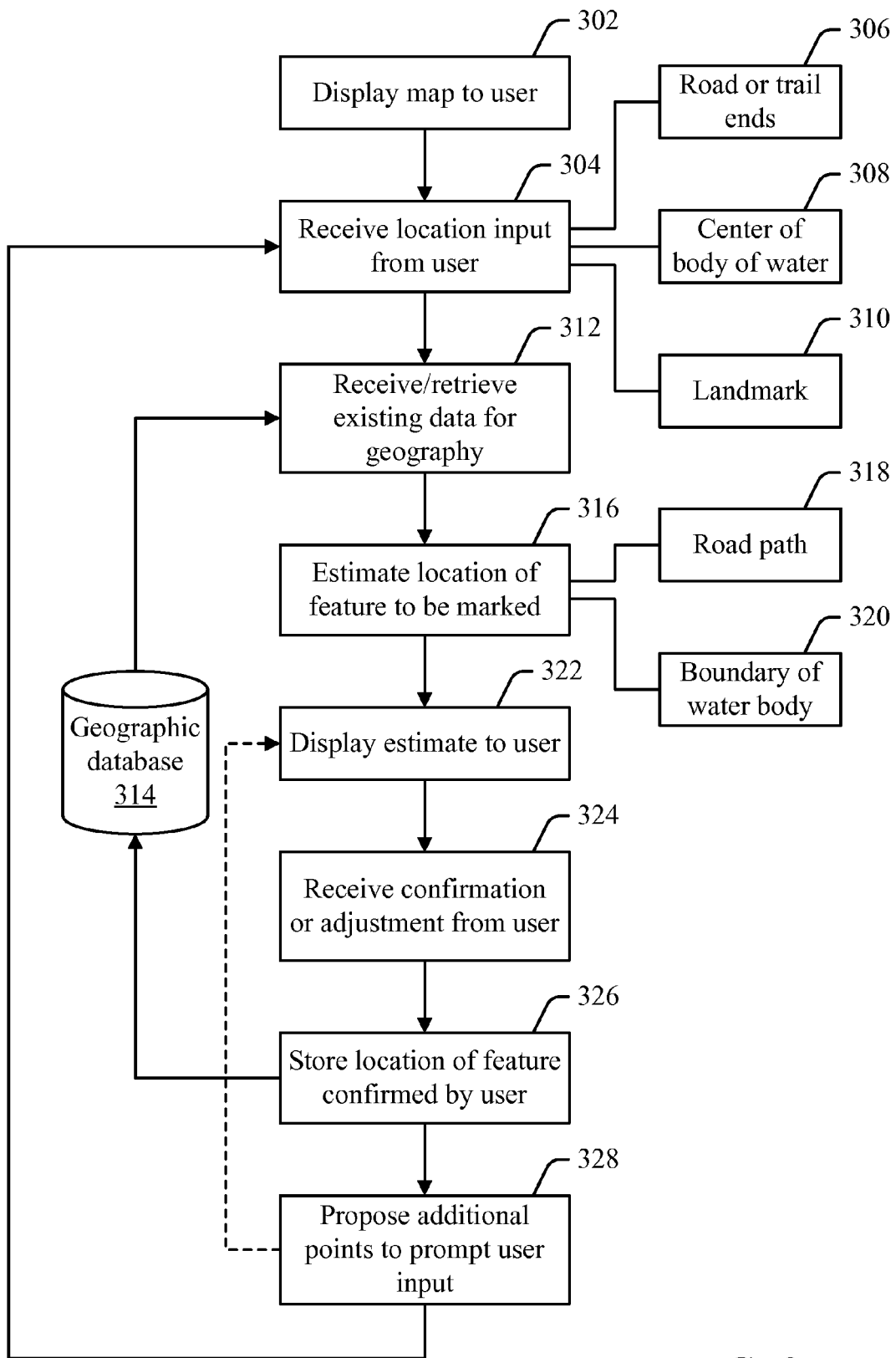
FIG. 3 is a flow diagram of an example process of allowing a user to provide information for a map.

FIG. 3 shows an example process of allowing a user to provide information for a map. Before turning to a description of FIG. 3, it is noted that the flow diagram of FIG. 3 is described, by way of example, with reference to components shown in FIGS. 1 and 2, although this process may be carried out in any system and is not limited to the scenarios shown in FIGS. 1 and 2. Additionally, the flow diagram in FIG. 3 shows an example in which stages of a process are carried out in a particular order, as indicated by the lines connecting the blocks, but the various stages shown in FIG. 3 can be performed in any order, or in any combination or sub-combination.

At 302, a map is displayed to a user. For example, the user may be visiting a web site that provides maps and/or directions, and the map may be shown to the user in the user's web browser. However, the map could be shown to the user in any context—e.g., in a standalone application on a computer, a mobile device (such as a wireless phone) or any other type of device. The map that is shown to the user may be interactive in the sense that the user can enter information on the map, such as the road endpoints discussed above. The map may provide clues about where the roads (or other features) to be entered are located. For example, the path of a road may show on a satellite photograph as a disturbance in the pattern of trees. Or, a system might possible outlines of a road (or other feature) based on various types of input. (E.g., roads might be detected through the sound of traffic, exhaust odors, vibrations, Global Positioning System GPS trails received pursuant to appropriate permission obtained from a user, etc., or any other mechanism. Once such a possible location of a road or feature has been detected, it could be shown to a user in some form on an interactive map as a way of suggesting a possible road or feature for the user to add.)

Using this interactive capability, at 304 location input is received from the user, where the location input shows the user's assertion of the location of a physical feature of the topography depicted by the map. Various types of input may be received, depicting various types of features. Examples of such types of input include endpoints or waypoints for a road or trail (block 306), the approximate center of a body of water (block 308), or the location of a landmark such as a building or monument (block 310).

At 312, pre-existing data relating to the geography that is depicted by the map may be received or retrieved from a geographic database 314. For example, there may be an existing map (such as a municipal or government map), or other users may previously have entered data indicating the location of the physical feature indicated by the user's input. Such data may be stored in geographic database 314 and may be received or retrieved at 312.

At 316, an estimate may be made of the location of the feature indicated by the user. For example, in the case where the user's input indicates the endpoints of a road, the estimate may be the path of the road, such as the segments tracing road 112 shown in FIG. 2 (see block 318). In the case where the user's input indicates the location of a body of water, the estimate may be the outline of the body of water (see block 320). At 322, the estimate may be displayed to the user. For example, in the case of a road, the line segments shown between points 202-208 (in FIG. 2) can be shown on the map, thereby showing the user the estimated path of the road. Or, in the case of a lake, the boundary 210 (also shown in FIG. 2) may be shown on the map, thereby showing the user the estimated location of the lake.

At 324, a confirmation of the estimate, and/or an indication of adjustment to be made to the estimate, may be received from the user. For example, the user might determine that the estimated path of the road is exactly right, in which case the user could confirm the estimated location of the road. Or, if the user believes that the estimated location is wrong, the user could fine tune the estimated location by moving some of the points 202-208 (shown in FIG. 2), or by adding additional points. Similarly, in the example of a lake, the user could fine tune the proposed boundary of the lake so that the boundary matches the user's knowledge about where the lake is, or so that it matches the user's human interpretation of those boundaries on an aerial or satellite photograph (which may be more accurate than the automatically estimated boundaries). Once those adjustments are made, the user could confirm the accuracy of the location (as modified by the user's adjustments) of the feature that the user is adding to the map.

At 326, the location of the feature, as confirmed by the user (and, possibly, as smoothed out by the system), may be stored in geographic database 314, thereby becoming part of the map that will be displayed in the future. (While FIG. 3 described a situation in which the user either confirms the proposed or user-edited location of a road or other feature, there may be situations where the system—after receiving user input—determines that the probability that it correctly understand the location of the feature is so high that the system simply adds the feature to the map without waiting for user confirmation. The subject matter herein will be understood to include such situations.)

As noted above, one aspect of the subject matter herein is the leveraging of the user's interest in adding to the map. One way to leverage this interest is to prompt the user to enter additional features on the map, such as additional roads (at 328). As discussed above (and with reference to FIG. 2), an aerial or satellite photograph may show some evidence of the existence of the roads, but may not show the roads' existence strongly enough for the map provider to include them on the map. However, with the existence of a road having been confirmed by a user (such as road 112, shown in FIGS. 1 and 2), the existence of cross streets that appear to intersect the road may become more apparent. Thus, the system may indicate the intersections between those cross streets and the road that has now been confirmed, as a way of prompting the user to confirm the existence of the cross streets. Or, in the case of a lake that the user has identified, the existence of rivers that feed into the lake may become more apparent, so the system may prompt the user with the possible location of those rivers.

The user might decline to input additional features on the map. However, if the user decides to identify additional features on the map, then the process may return to 304, to receive that new input and to receive confirmation from the user, as described above. Or, in another example (as indicated by the dotted line in FIG. 3), the system might return to 322 in the sense that it simply proposed new features for the user to confirm without waiting for the user to provide some input about those feature. E.g., rather than asking the user to mark the endpoints or waypoints of cross-streets, the system might simply show the user where it thinks the cross-streets are, and ask the user to confirm those streets as being real features to add to the map.

Figure 4:
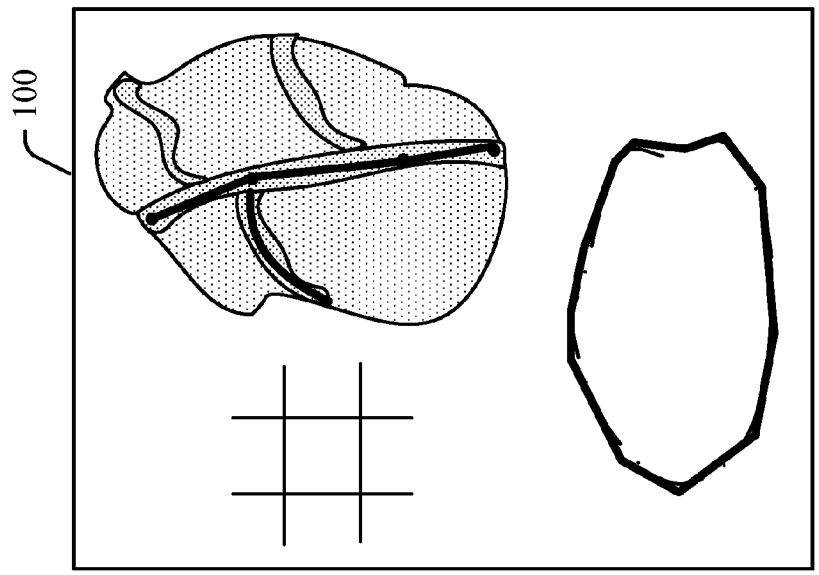
FIG. 4 is a block diagram of an example set of components that may be used to allow a user to provide map input.
Figure 4:
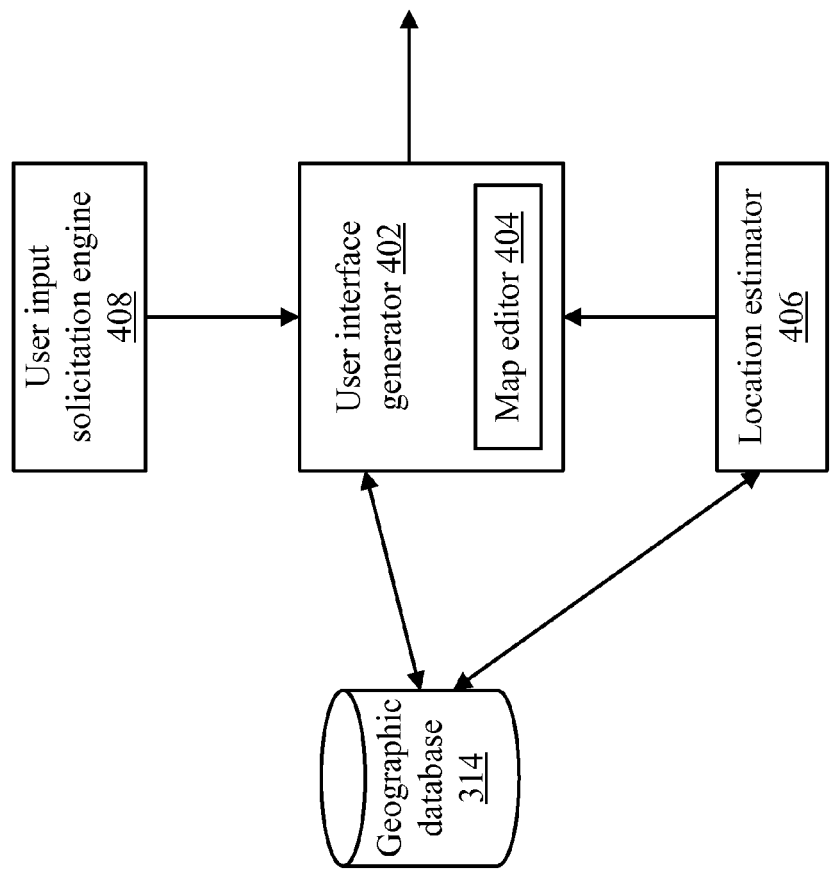

FIG. 4 shows an example set of components that may be used to allow a user to provide map input. User interface generator 402 provides a visual interface that displays a map 100 to the user and allows the user to add information to map 100. (In FIG. 4, detailed in map 100 are the same as those shown in FIG. 2.) The data from which the map is created may be stored in geographic database 314. In order to allow a user to add information to map 100, user interface generator 402 may include a map editor 404. Map editor 404 implements the interactive component of the visual interface—i.e., the component that allows the user to enter the endpoints or waypoint of a linear feature (such as a road's endpoints) or an indication of another type of feature (such as the center of a lake or parking lot), to move or add points in an estimated path, to confirm an estimated path for a road, or to perform any other editing task.

Location estimator 406 determines the likely location of a road (or other object, such as a lake) based on user input. For example, if the user provides endpoints for a road, location estimator 406 determines the path of the road based on existing map data (which may be in geographic database 314), based on previously-provided data from users (which also may be in geographic database 314), based on visual analysis of a photograph, etc.

As noted above, once a user has provided features to be added to a map, a system may want to leverage the user's interest in providing such input by soliciting more input from the user. Asking the user for more input may be done by user input solicitation engine 408. For example, user input solicitation engine may detect cross-streets that intersect with a road that the user has just identified, and may indicate those cross-streets to the user (e.g., by marking the cross-streets with points on the map), thereby encouraging the user to identify the endpoints for the cross-streets.

Figure 5:
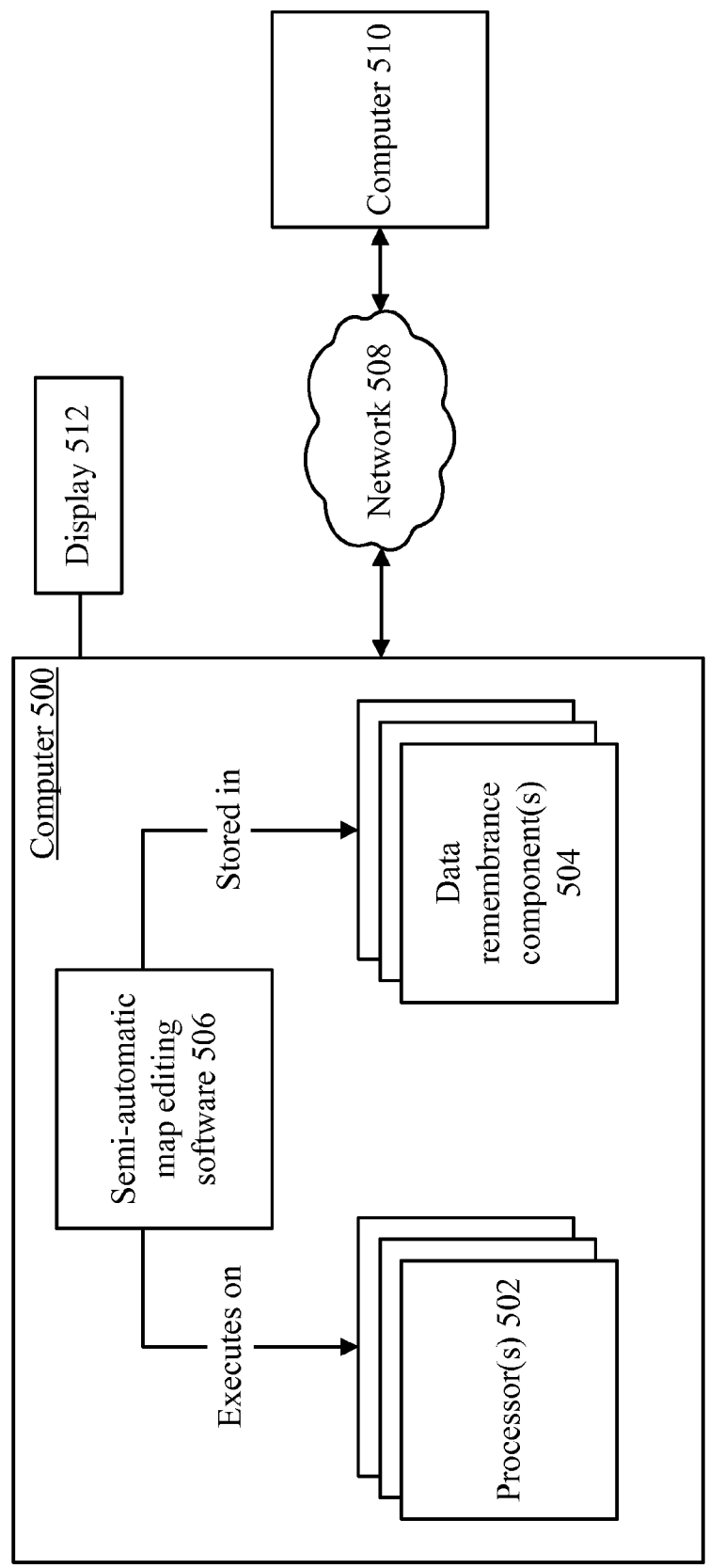
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is semi-automatic map editing software 506, which may allow a user to edit a map, and which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media or computer-readable storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected. In one example, algorithms implementing the subject matter herein may be executed on computer 500, and the results may be transferred across a network to computer 510 (or to any other type of device, such as a wireless telephone).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories that store executable instructions to edit a map, the executable instructions, when executed by a computer, causing the computer to perform acts comprising:
   receiving, from a user, location input that indicates a location of a feature to be added to a map;
   making an estimate of a physical location of said feature, said estimate being based on said location input and on an analysis of a photograph of a region covered by said map, said estimate including a probability that said feature is located at said physical location, said probability being below a level at which it can be concluded that said feature is located at said physical location;
   displaying said estimate to said user on said map;
   receiving, from said user, an indication of adjustments to be made to said estimate;
   receiving, from said user, an indication that said estimate, as modified by said adjustments, is where said feature is located on said map; and
   adding said feature to said map by storing said feature in a database.

2. The one or more computer-readable memories of claim 1, said feature comprising a road that is not shown on said map, and said location input comprising endpoints or waypoints of said road.

3. The one or more computer-readable memories of claim 1, said feature comprising a geographic aspect of land covered by said map, and said location input comprising an indication of a central point in said geographic aspect.

4. The one or more computer-readable memories of claim 1, said estimate being further based on pre-existing data concerning said region, said pre-existing data concerning said region comprising another user's previous input of said feature.

5. The one or more computer-readable memories of claim 1, said feature comprising a road or trail, and said displaying of said estimate comprising displaying a curve or a set of line segments along a path of said road or trail.

6. The one or more computer-readable memories of claim 1, said acts further comprising:
   based on said feature's having been confirmed to exist, proposing locations of additional features on said map for said user to confirm or edit.

7. The one or more computer-readable memories of claim 6, said feature being a road, said additional features being cross-streets that intersect said road, said locations of additional features being proposed by indicating, with points on said map, intersections between said road and said cross-streets.

8. A method of editing a map, the method comprising:
   using a processor to perform acts comprising:
   displaying, to a user, a user interface that comprises a map;
   receiving, from said user, location input that indicates a location of a feature to be added to said map;
   making an estimate of a physical location of said feature, said estimate being based on said location input and on an analysis of a photograph of a region covered by said map, said estimate including a probability that said feature is located at said physical location, said probability being below a level at which it can be concluded that said feature is located at said physical location;
   displaying said estimate to said user on said map;
   receiving, from said user, an indication of adjustments to be made to said estimate;
   receiving, from said user, an indication that said estimate, as modified by said adjustments, is where said feature is located on said map; and
   adding said feature to said map.

9. The method of claim 8, said feature comprising a road that is not shown on said map, and said location input comprising endpoints or waypoints of said road.

10. The method of claim 8, said feature comprising a geographic aspect of land covered by said map, and said location input comprising an indication of a central point in said geographic aspect.

11. The method of claim 8, said estimate being further based on pre-existing data concerning said region, said pre-existing data concerning said region comprising another user's previous input of said feature.

12. The method of claim 8, said feature comprising a road, and said displaying of said estimate comprising displaying a curve or a set of line segments along a path of said road.

13. The method of claim 8, said acts further comprising:
based on said feature's having been confirmed to exist, proposing locations of additional features on said map for said user to confirm or edit.

14. The method of claim 13, said feature being a road, said additional features being cross-streets that intersect said road, said locations of additional features being proposed by indicating, with points on said map, intersections between said road and said cross-streets.

15. A system for editing a map, the system comprising:
a memory;
a processor;
a database;
a user interface generator that is stored in said memory and that executes on said processor, said user interface generator displaying a map to a user, said user interface generator comprising a map editor that receives, from said user, location input that indicates a location of a feature to be added to a map; and
a location estimator that is stored in said memory and that executes on said processor, and that makes an estimate of a physical location of said feature, said estimate being based on an analysis of a photograph of a region covered by said map, said estimate including a probability that said feature is located at said physical location, said probability being below a level at which it can be concluded that said feature is located at said physical location, said user interface generator displaying said estimate to said user on said map and receiving, from said user, an indication of adjustments to be made to said estimate, said system adding said feature to said map by storing said feature in said database.

16. The system of claim 15, said feature comprising a road that is not shown on said map, and said location input comprising endpoints or waypoints of said road.

17. The system of claim 15, said feature comprising a geographic aspect of land covered by said map, and said location input comprising an indication of a central point in said geographic aspect.

18. The system of claim 15, said estimate being further based on pre-existing data concerning said region, said pre-existing data concerning said region comprising another user's previous input of said feature.

19. The system of claim 15, said feature comprising a road or trail, and said user interface generator displaying of said estimate by displaying a curve or a set of line segments along a path of said road or trail.

20. The system of claim 15, said feature being a road, said system further comprising:
a user input solicitation engine that, based on said road's having been confirmed to exist, proposes cross-streets that intersect said road by displaying, on said map, points of intersection between said road and said cross-streets.

* * * * *